United States Patent [19]

Raidel

[11] Patent Number: 4,530,515
[45] Date of Patent: Jul. 23, 1985

[54] DUAL STUB AXLE AIR SPRING SUSPENSION WITH HIGH-AXLE HYDRAULIC LIFT

[76] Inventor: John E. Raidel, Rte. 1, Box 400-N, Springfield, Mo. 65804

[21] Appl. No.: 549,894

[22] Filed: Nov. 9, 1983

[51] Int. Cl.³ .............................................. B60G 11/12
[52] U.S. Cl. .................................... 280/704; 280/683
[58] Field of Search ............... 280/704, 43, 43.17, 280/43.23, 683, 685

[56] References Cited

U.S. PATENT DOCUMENTS

| | | | |
|---|---|---|---|
| 3,064,994 | 11/1962 | Limmer | 280/704 |
| 3,147,023 | 9/1964 | Raymo | 280/43.23 |
| 4,065,153 | 12/1977 | Pringle | 280/704 |
| 4,165,884 | 8/1979 | Allison et al. | 280/704 |
| 4,166,639 | 9/1979 | Taylor | 280/704 |

*Primary Examiner*—Joseph F. Peters, Jr.
*Assistant Examiner*—Ross Weaver
*Attorney, Agent, or Firm*—Rogers, Howell, Renner, Moore & Haferkamp

[57] ABSTRACT

An air ride, high axle lift tandem comprising two stub-axle mountings each with an air spring and a hydraulic cylinder to lift the stub axle and all mounted upon a single pedestal in a manner to be so compact and simple as to enable the entire assembly to be sold as a unit as, for example, in a kit.

10 Claims, 6 Drawing Figures

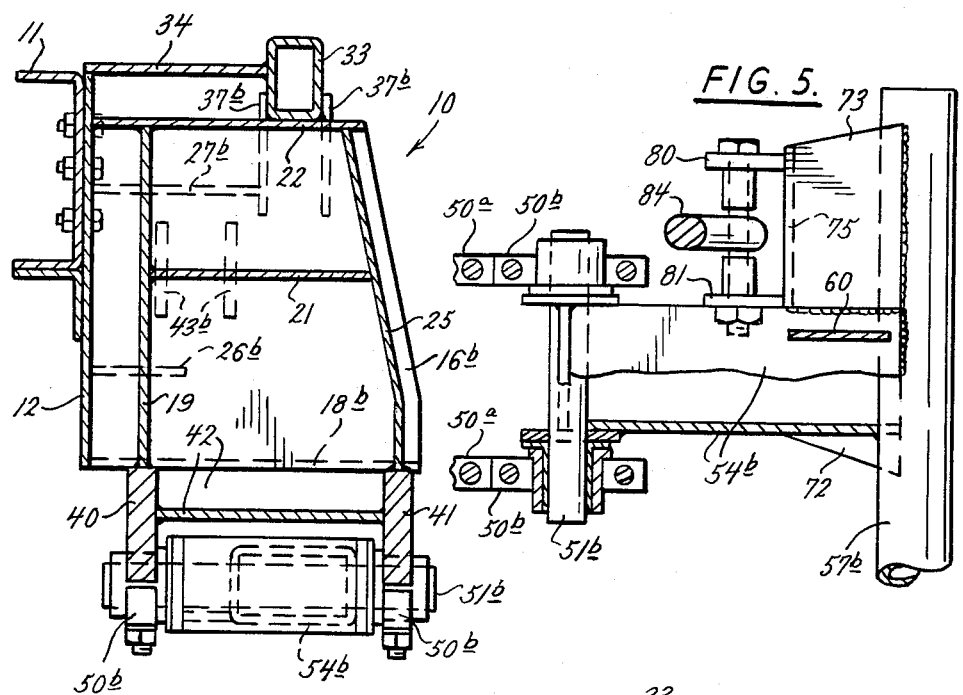
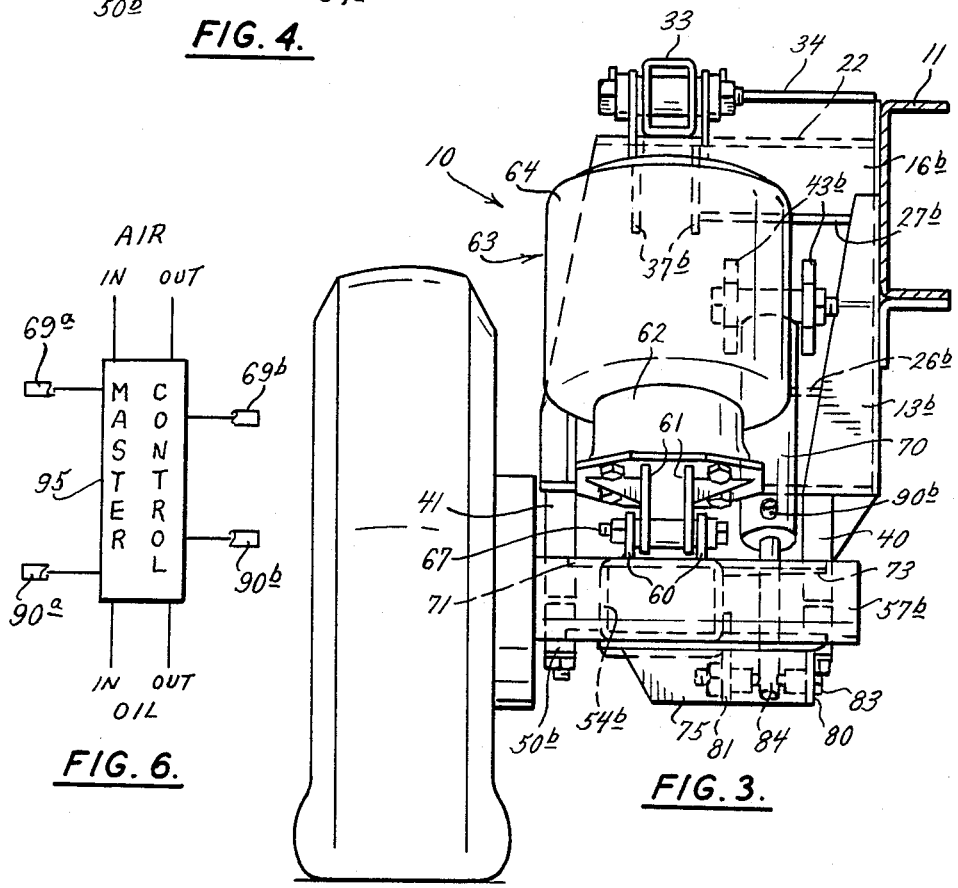

DUAL STUB AXLE AIR SPRING SUSPENSION WITH HIGH-AXLE HYDRAULIC LIFT

BACKGROUND OF THE INVENTION

The present invention relates to an axle lift arrangement for vehicles that enables the operator of the vehicle to raise or lower axles depending upon the need for additional wheels under the vehicle, or the lack of such need.

Lifts for vehicle axles have been provided in the past. The Verdi U.S. Pat. No. 3,390,895 of 1968 shows one, and Raidel U.S. Pat. Nos. 3,794,344 of 1974 and 3,912,294 of 1975 show other such apparatus.

SUMMARY OF THE INVENTION

A principal object of the present invention is to provide a single unit having means to select either or both of two individually-controllable lifts to provide the lifting or releasing of two individual wheels on a vehicle.

It is a further object of the invention to provide a mechanism of this kind that is compact and rigid so that it can be spaced outwardly from the frame of the vehicle.

A further object is to provide a mechanism of this kind that can be sold as a pre-assembled kit for mounting on a truck frame or can be distributed in a disassembled or partly assembled form but also can be readily fully assembled.

Another object of the invention is to provide a mechanism of this kind that uses stub axles for the wheels and yet which is rigid and strong enough to be used on heavy-duty vehicles. Also it can be used with tag axles, and with either one or two axles.

Another object of the invention is to provide a mechanism of this kind wherein air springs are used for each of the stub axles and a hydraulic mechanism is provided for each of them for lifting it individually or lowering its wheel.

In the drawings:

FIG. 3 is an end elevation taken from the right of FIG. 1;

FIG. 4 is a vertical section on the line 4—4 of FIG. 2; and

FIG. 5 is a substantially horizontal section taken substantially on the line 5—5 of FIG. 2.

FIG. 6 is a diagrammatic view of a master control.

DESCRIPTION OF PREFERRED EMBODIMENT

Figure 1:
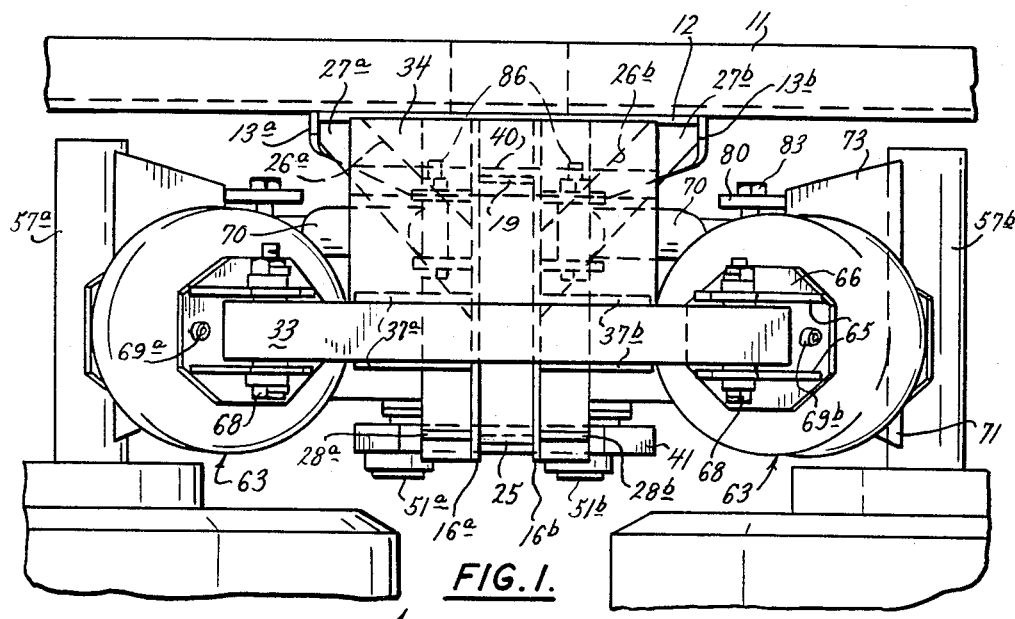
FIG. 1 is a plan view of the present mechanism mounted on the frame of a vehicle such as a truck.
Figure 2:
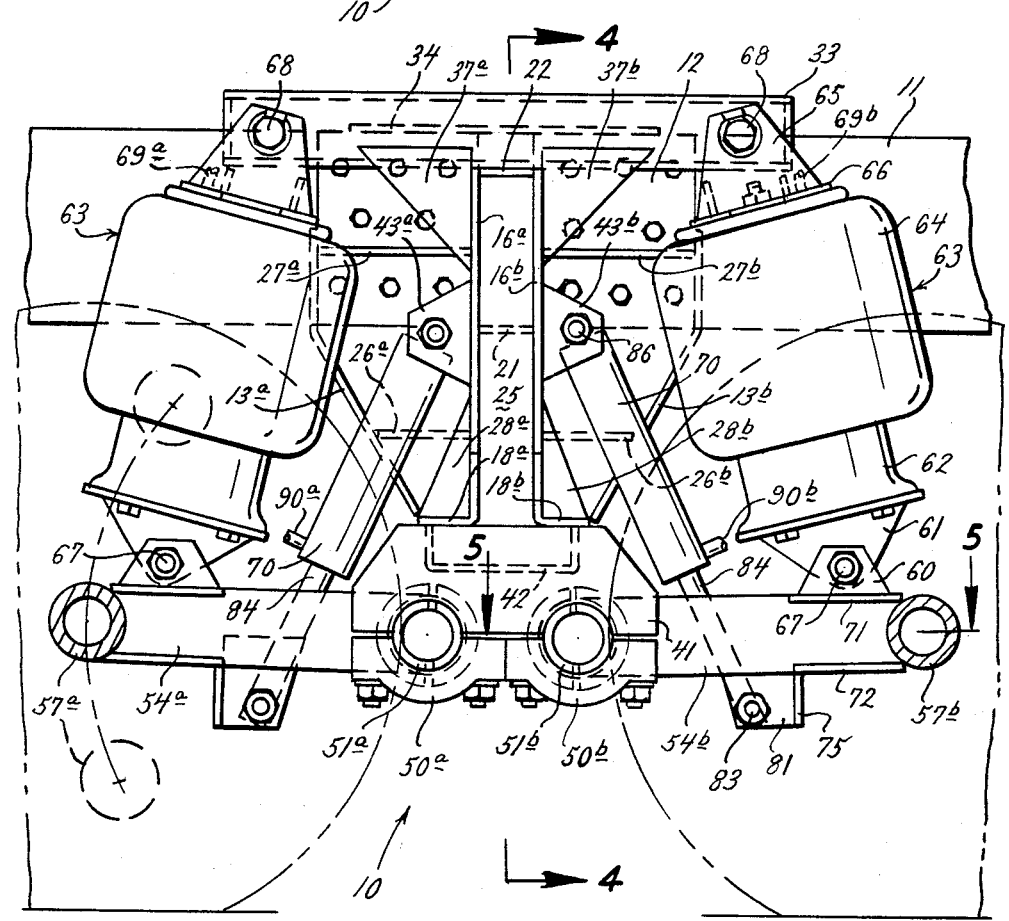
FIG. 2 is a side elevation of the mechanism mounted on the frame.

This suspension incorporates a steel pedestal assembly generally indicated at 10, that is adapted to be bolted onto the frame 11 of the vehicle, as shown. To this end the pedestal has a back plate 12 that lies vertically flush against the vertical member of the frame but extends down below the same, tapering toward its bottom. Edge reinforcements 13a and 13b project outwardly from the edges of the back plate. Projecting outwardly from the vertical back plate 12 are two spaced vertical plates 16a and 16b securely welded to the back plate, and at their bottoms having outwardly turned flanges 18a and 18b.

Spaced outwardly from the back plate 12 and welded between the side plates 16a and 16b is a vertical reinforcing plate 19. It is located above a bearing, as will appear. Midway up between the two vertical plates 16a and 16b, there is a horizontal reinforcement plate 21 welded to the two vertical plates, the plate 21, and the plate 19. At the top of the two vertical plates there is another horizontal plate 22 extending forwardly from the back plate 12, and welded to the side plates, the plate 19, and to the back plate 12. Between the two vertical side plates 16a and 16b there is a front plate 25 that extends down at an angle corresponding to the angle of the side plates. The foregoing parts are steel, and are securely welded together. They form a box-type support.

Additionally there are horizontal reinforcing gusset plates, triangular in shape, welded to the back plate 12, and extending forwardly therefrom outside the two side plates 16a and 16b. These are shown as the lower gussets 26a and 26b, and upper gussets 27a and 27b. In addition there are vertical gussets 28a and 28b, also triangular in shape at the outer parts of the side plates 16a and 16b joining the vertical portions thereof and the horizontal portions 18a and 18b.

A little outward of the middle of the top plates 22, a rectangular tubular beam 33 is disposed horizontally, in a fore and aft direction, as seen particularly in FIG. 4. A horizontally disposed upper plate 34 rests on and is welded to the top of the back plate 12 and to the side of the beam 33, as well as to the tops of the vertical side plates 16a and 16b. A pair of triangular gussets 37a are welded to the opposite sides of the beam 33 and to the side plate 16a. Similar gussets 37b are welded to the opposite sides of the beam 33 and to the side plate 16b.

To the bottom of the pedestal assembly are fixed the upper halves of inner and outer bearing supports 40 and 41. A channel 42 is secured to the two members 40 and 41 and to the bottom of the side members 18a and 18b.

Also secured to the side members for a purpose to appear are pairs of ears 43a and 43b.

The depending bearing support members 40 and 41 have two semicircular cutouts closed by similar cutouts in bearing caps 50a and 50b secured by appropriate bolts to the depending members 40 and 41. Appropriate bushing means that may include rubber torsion washers or other shim means are provided.

The bearing caps 50a and 50b are bolted in place as indicated, and hold stub shafts 51a and 51b. Bolster beams 54a and 54b are the same in construction though extending in opposite directions. They are composite structures basically rectangular in cross-section as indicated in FIG. 4 in dashed lines, and bear rotatably, as indicated on the stub shafts 51a and 51b, respectively. At the outer ends of the two bolster beams 54a and 54b, stub axles 57a and 57b are welded.

The functions of the bolster beams are to support air cushion springs and to transmit forces from hydraulic pistons to the stub axles. To this end the bolster beam 54b will be described, it being understood that the bolster beam 54a is constructed in like fashion.

Toward the outer end of the bolster beam 54b adjacent the stub shaft 57b, there are welded two upstanding pivot ears 60. Between them they receive complimentary ears 61 attached to the lower member 62 of an air spring generally indicated at 63. The upper member 64 of the air spring 63 has upstanding pivot ears 65 projecting from a mounting plate 66 here shown as being octagonal. A pivot 67 secures the lower member 62 of the air spring between the ears 60; and a pivot 68 secures member 64 to the cross beam 33. The air spring 63 is otherwise of conventional shape and operation, as shown at 34 and 134 in my U.S. Pat. No. 3,794,344, or as in U.S. Pat. No. 3,434,707. Air may be delivered into or exhausted from the air springs 63 by passages 69a and 69b.

The bolster beam also has extension plates to enable it to be connected with a hydraulic cylinder 70 that, as shown in the drawings, is laterally spaced from the axis of the air spring 63. To the top at the outer side of the bolster beam 54b, plate 71 is welded, and an angular plate 72 is welded to the bottom of the beam 54b, with one side 75 vertical. On the opposite or inner side of the bolster beam, a similar, though somewhat wider, upper plate 73 is welded; and these plates 71–73 are also welded to the stub axles 57b. Pivot ears 80 and 81 are welded to the plate 75 and receive the pivot axis 83 of the hydraulic cylinder 70. The push rod 84 of the hydraulic cylider 70 is connected to this pivot 83.

The upper end, or cylinder end, of the cylinder, 70 is swiveled by a pivot 86 between the ears 43b attached to the pedestal assembly. Hydraulic fluid is admitted or received through passages 90a and 90b. A master control 95 can be operated to admit or exhaust air or oil to or from either or both air openings 63 and hydraulic cylinder 70.

INSTALLATION AND OPERATION

The apparatus may be delivered either wholly or partly pre-assembled onto the pedestal. If wholly preassembled and all the parts thereof, including the pedestal and all the parts welded thereto, the bolster beams, the air springs, and the hydraulic cylinders will be mounted as shown, with or without the presence of the stub shafts welded on the bolster beams. The foregoing structure is very strong because the steel parts welded together to form the pedestal are reinforced against deformation in any direction, regardless of the cantilever disposition with respect to the frame 11. The primary vertical load tending to distort the mechanism is absorbed by the plates 16a and 16b, the plate 25 attached to the horizontal plates, and the edge members 13a and 13b. As is evident, the transmission of the vertical forces through the air springs presents the stresses to the beam 33 which is securely braced by the horizontal, as well as the vertical, reinforcements.

To obtain compactness, the hydraulic cylinders 70 are placed outward from the frame close to the air springs, but sufficiently far away from them to provide full freedom of movement required. In addition, there are vertical gussets 28a and 28b, triangular in shape, at the outer parts of the side plates 16a and 16b, joining the vertical portions thereof and the horizontal portions 18a and 18b.

To mount the apparatus on a truck, after appropriate drill holes are made to receive them, screws are fastened through the pedestal 12 and the same is bolted onto the frame 11 of the vehicle. It will be understood that one of these assemblies will be attached to each side of the vehicle to dispose the wheels in appropriate positions. The stub axles are welded to the ends of the bolster beams. The air springs 63 are then connected to a source of compressed air in the cab of the vehicle with an appropriate valve such as a three-way valve so that the air can be admitted to the interior of the air springs or can be exhausted therefrom. The hydraulic cylinders 70 below the pistons, and push rods are connected to a source of hydraulic liquid under pressure and likewise may be controlled by a three-way valve in the cab of the vehicle that can admit hydraulic liquid to lift the pistons and piston rods 84 or to exhaust the liquid and permit them to lower under their own weight or with the aid of springs in the upper parts of the cylinders as is known in the art.

The master control 95 diagrammatically represents known control means for fluid apparatus. An air control is shown in U.S. Pat. No. 3,390,895 to Verdi and an exhaust system for controlled exhaust of the air springs is shown in Weiss U.S. Pat. No. 2,903,256. A hydraulic control is shown in Raidel U.S. Pat. No. 4,093,272 or U.S. Pat. No. 4,089,544. In each case it would be desirable to have individual controls for each of the combinations of hydraulic cylinder and air spring or at least to have separate controls for the forwardly-disposed spring and motor from the rearwardly-disposed spring and motor to enable the forward wheels to be lifted independently of the rearward wheels. Also, the master control should be programmable to operate both axles together.

When the vehicle is to be operated under heavy loads requiring the stub axle wheels to be on the ground to take some of the load, the hydraulic cylinders 70 are released and air under pressure is supplied to the air springs 63 to such point that the stub axle wheels are carrying their appropriate part of the load. In this condition, the air springs will operate in conventional manner to absorb the shocks of the road and the pistons in the piston motors can move freely because they are untrammeled by the presence of hydraulic fluid locked onto either side of the pistons.

If it is unnecessary to have the tag axle wheels down, as for example after the vehicle has unloaded its heavy load, the hydraulic cylinders or the appropriate ones of them can be operated by delivering hydraulic fluid under pressure to the lower ends of the cylinders. This will cause the corresponding bolster beams to be elevated, lifting the corresponding wheels off the ground. In this operation, the normal condition is to release the pressure from the corresponding air spring as in the manner of the prior patents above referred to.

The unit is very compact and is ideally adapted to be used as a kit for addition to an existing vehicle. The disposition of the hydraulic cylinders in the manner indicated, inside of the air springs, adds to the compactness of the unit and is possible because of the added capacities of the hydraulic cylinders compared to that of the air springs, owing to the incompressibility of the hydraulic fluid.

A principal advantage of this invention is the ability to elevate either the forward or the rearward stub axle or both of them so that either one or the other of the sub-axle wheels is on the ground or neither of them or both of them. All of this is done within the compact arrangement such that it can be readily assembled and added to an existing vehicle without requiring much room.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What I claim is:

1. In an apparatus for lifting axles on vehicles: a pedestal adapted to be attached to the frame of the vehicle, the pedestal having a portion attachable to the frame, and a vertically extending portion disposed at one side of the frame, a pair of oppositely extending bolster beams rockably attached to the lower part of the pedestal to one side of the frame, one extending forward and one extending aft, each being adapted to receive axle means for a vehicle wheel; the pedestal having securely thereon at the upper part of the vertically extending portion, fore and aft upper extending support means spaced to one side of the frame and above and overlying the bolster beams; a pair of spring means one connected between each bolster beam and the support means above it, arranged at one side of the frame, to cushion the rocking movements of the bolster beams; motors, one for each bolster beam, connected between such bolster beam and the pedestal and actuatable to produce lifting and lowering of the bolster beam.

2. The assembly of claim 1 wherein there is operator-regulated means to control each of the motors individually so that either of the bolster beams can be lifted independently of the other, at the option of the user.

3. In the apparatus of claim 1, the pedestal comprising also a platelike member attachable to the frame of the vehicle to depend therefrom; outwardly extending metal members connected to the pedestal, spaced from each other but connected together for greater rigidity; means at the bottom of the pedestal laterally of the frame for rockably supporting the two bolster beams laterally of the frame; and the upper support means comprising an elongated beam extending fore and aft of the apparatus in its upper part and supported laterally of the frame on the outwardly extending members, it supporting the two air spring means on opposite sides of the outwardly extending members.

4. A combination of claim 3 where there are swivel means extending outwardly from the opposite sides of the outwardly extending members to which the power motors are attached.

5. In the apparatus of claim 1, the spring means being air springs.

6. In the apparatus of claim 1: each motor having a cylinder and piston push-rod element, each having one of the elements swivelled to the pedestal and so the other element swivelled to a bolster beam.

7. In the device of claim 6, the springs being air springs that are spaced apart with the motors located between them.

8. In the axle lifting means of the kind described: a pedestal comprising a base plate attachable to the frame of the vehicle and having a medial portion depending therefrom; two parallel outwardly extending plates rigidly attached to the medial portion of the base plate and projecting laterally with respect to the frame of a vehicle upon which the base plate is mounted; means connecting the parallel plates for their mutual support; bolster beam bearing means secured to the lower part of the outwardly projecting plates and having bearing means rockably to support fore and aft bolster beams laterally outward of the frame of the vehicle; an upper support comprising a horizontal beam mounted outwardly of the base plate upon the outwardly extending plates to extend fore and aft of the vehicle outwardly from the frame, adapted to support the ends of air springs, and means on the sides of the outwardly extending plate members adapted to receive the upper ends of hydraulic cylinder motors.

9. In an axle lifting means of claim 8: bolster beams, one extending in each direction from the bolster beam bearing means and rockably mounted in the said bearing means; a pair of air springs, each having its lower end mounted rockably on a bolster beam and its upper end rockably mounted on the horizontal upper beam; a pair of hydraulic motors of the piston type, each being rockably attached to a bolster beam inwardly thereof from the air spring attachment and extending upwardly and rockably attached to the means on the pedestal.

10. The apparatus of claim 8 with stub axles secured to the outer ends of each of the bolster beams, the entire structure aforesaid being attached together as a compact unit.

* * * * *